US012211637B2

(12) United States Patent
Masuda et al.

(10) Patent No.: US 12,211,637 B2
(45) Date of Patent: Jan. 28, 2025

(54) COIL COMPONENT AND MANUFACTURING METHOD OF COIL COMPONENT

(71) Applicant: Murata Manufacturing Co., Ltd., Kyoto-fu (JP)

(72) Inventors: Yukinobu Masuda, Nagaokakyo (JP); Shigeto Yamamoto, Nagaokakyo (JP); Shingo Nakamoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 653 days.

(21) Appl. No.: 17/540,014

(22) Filed: Dec. 1, 2021

(65) Prior Publication Data

US 2022/0172882 A1 Jun. 2, 2022

(30) Foreign Application Priority Data

Dec. 2, 2020 (JP) ................................ 2020-200260

(51) Int. Cl.

| | |
|---|---|
| ***H01F 27/28*** | (2006.01) |
| ***H01F 27/24*** | (2006.01) |
| ***H01F 27/29*** | (2006.01) |
| ***H01F 41/02*** | (2006.01) |
| ***H01F 41/06*** | (2016.01) |

(52) U.S. Cl.

CPC ......... *H01F 27/2823* (2013.01); *H01F 27/24* (2013.01); *H01F 27/29* (2013.01); *H01F 41/0206* (2013.01); *H01F 41/06* (2013.01)

(58) Field of Classification Search

CPC ...... H01F 27/2823; H01F 27/24; H01F 27/29; H01F 41/0206; H01F 41/06

See application file for complete search history.

(56) References Cited

U.S. PATENT DOCUMENTS

2005/0237141 A1* 10/2005 Hirai .................... H01F 27/292 336/83
2014/0167903 A1* 6/2014 Tomonari ............. H01F 17/045 336/220
2015/0371766 A1* 12/2015 Kawasaki ............ H01F 17/045 336/212

(Continued)

FOREIGN PATENT DOCUMENTS

JP 2005322684 A * 11/2005
JP 2017-011288 A 1/2017
JP 2020-126976 A 8/2020

*Primary Examiner* — Malcolm Barnes

(74) *Attorney, Agent, or Firm* — Studebaker & Brackett PC

(57) ABSTRACT

A coil component comprises a first wire including a winding portion wound around a winding core portion of a core, a first end portion electrically connected to a terminal electrode provided in a first flange portion, and a first extended portion connecting the winding portion and the first end portion. In a first direction, the first end portion is positioned on a first side with respect to a central axis of the winding core portion, and a first boundary portion which is a boundary portion between the first extended portion and the winding portion is positioned on a second side with respect to the central axis. A corner of the winding core portion is positioned between the first boundary portion and the first end portion in a circumferential direction. A gap is interposed between the first extended portion and the corner.

20 Claims, 5 Drawing Sheets

(56) References Cited

U.S. PATENT DOCUMENTS

| | | | | |
|---|---|---|---|---|
| 2017/0011844 | A1* | 1/2017 | Mikogami | H01F 41/127 |
| 2018/0211764 | A1* | 7/2018 | Komaya | H01F 17/04 |
| 2019/0189337 | A1* | 6/2019 | Kawasaki | H01F 27/24 |
| 2021/0391108 | A1* | 12/2021 | Kunitsuka | H01F 27/006 |

* cited by examiner

COIL COMPONENT AND MANUFACTURING METHOD OF COIL COMPONENT

CROSS-REFERENCE TO RELATED APPLICATION

This application claims benefit of priority to Japanese Patent Application No. 2020-200260, filed Dec. 2, 2020, the entire content of which is incorporated herein by reference.

BACKGROUND

Technical Field

The present disclosure relates to a coil component and a manufacturing method of a coil component.

Background Art

As described in Japanese Patent Application Laid-Open No. 2017-11288, a coil component is known which includes a core and a wire wound around a winding core portion of the core. A first flange portion is connected to a first end of the winding core portion, and a second flange portion is connected to a second end of the winding core portion. The first flange portion is provided with a first terminal electrode and a second terminal electrode. The second flange portion is provided with a third terminal electrode and a fourth terminal electrode. The first wire and the second wire are wound around the winding core portion. Further, a first end portion of the first wire is electrically connected to the first terminal electrode, and a second end portion of the first wire is electrically connected to the third terminal electrode. Further, the first end portion of the second wire is electrically connected to the second terminal electrode, and the second end portion of the second wire is electrically connected to the fourth terminal electrode.

SUMMARY

In the coil component as described above, a coated conducting wire is used as a wire. For example, the wire includes a linear central conductor and a coating film formed of resin. Further, such a wire is wound around the winding core portion. In a case where such a coil component is mounted on a circuit board using solder, a flux component contained in the solder may reach the winding core portion from the terminal electrode along the wire. When the flux component reaches the winding portion, which is a portion wound around the winding core portion, of the wire, there is a possibility that performance as a coil component is affected in some way.

Accordingly, one aspect of the coil component includes a core which has a prismatic winding core portion, a first flange portion connected to a first end of the winding core portion in an axial direction which is a direction in which a central axis of the winding core portion extends, and a second flange portion connected to a second end of the winding core portion in the axial direction; a first terminal electrode provided in the first flange portion; a second terminal electrode provided in the second flange portion; and a wire which has a winding portion wound around the winding core portion, a first end portion electrically connected to the first terminal electrode, a second end portion electrically connected to the second terminal electrode, a first extended portion connecting the winding portion and the first end portion, and a second extended portion connecting the winding portion and the second end portion. In a first specified direction which is a direction orthogonal to the axial direction, the first end portion is disposed on a first side with respect to the central axis, and a first boundary portion which is a boundary portion between the first extended portion and the winding portion is disposed on a second side with respect to the central axis. Among a plurality of corners of the winding core portion positioned on the second side with respect to the central axis in the first specified direction, a first predetermined corner which is a corner positioned closest to the first end portion in a circumferential direction around the central axis is positioned between the first boundary portion and the first end portion in the circumferential direction. A gap is interposed between the first extended portion and the first predetermined corner.

According to the above configuration, the gap is interposed between the first corner of the winding core portion and the first extended portion. Therefore, in a case where the coil component is mounted on the circuit board using solder, also when the flux component contained in the solder travels along the wire, the flux component is be prevented from reaching the winding core portion.

In one aspect of a manufacturing method of a coil component is a manufacturing method of a coil component in which the coil component includes a core and a wire. The core has a prismatic winding core portion, a first flange portion connected to a first end of the winding core portion in an axial direction which is a direction in which a central axis of the winding core portion extends, and a second flange portion connected to a second end of the winding core portion in the axial direction. The wire has a winding portion wound around the winding core portion, a first end portion electrically connected to a terminal electrode provided in the first flange portion, a second end portion electrically connected to a terminal electrode provided in the second flange portion, and a first extended portion connecting the winding portion and the first end portion, and a second extended portion connecting the winding portion and the second end portion. The manufacturing method includes forming the winding portion by winding the wire around the winding core portion; and extending the wire from the winding core portion to the terminal electrode provided in the second flange portion and fixing the second end portion of the wire to the terminal electrode in a state where a tension of the wire is set to be smaller than a tension of the wire in forming the winding portion.

When the coil component is manufactured by the above manufacturing method, it is easy to form the gap between the first extended portion of the wire and the first corner of the winding core portion. That is, the coil component manufactured by the manufacturing method can obtain the same effect as the above-described coil component.

According to the present disclosure, in a case where the coil component is mounted on the circuit board using solder, also when the flux component contained in the solder travels along the wire, the flux component can be prevented from reaching the winding core portion.

DETAILED DESCRIPTION

Figure 1:
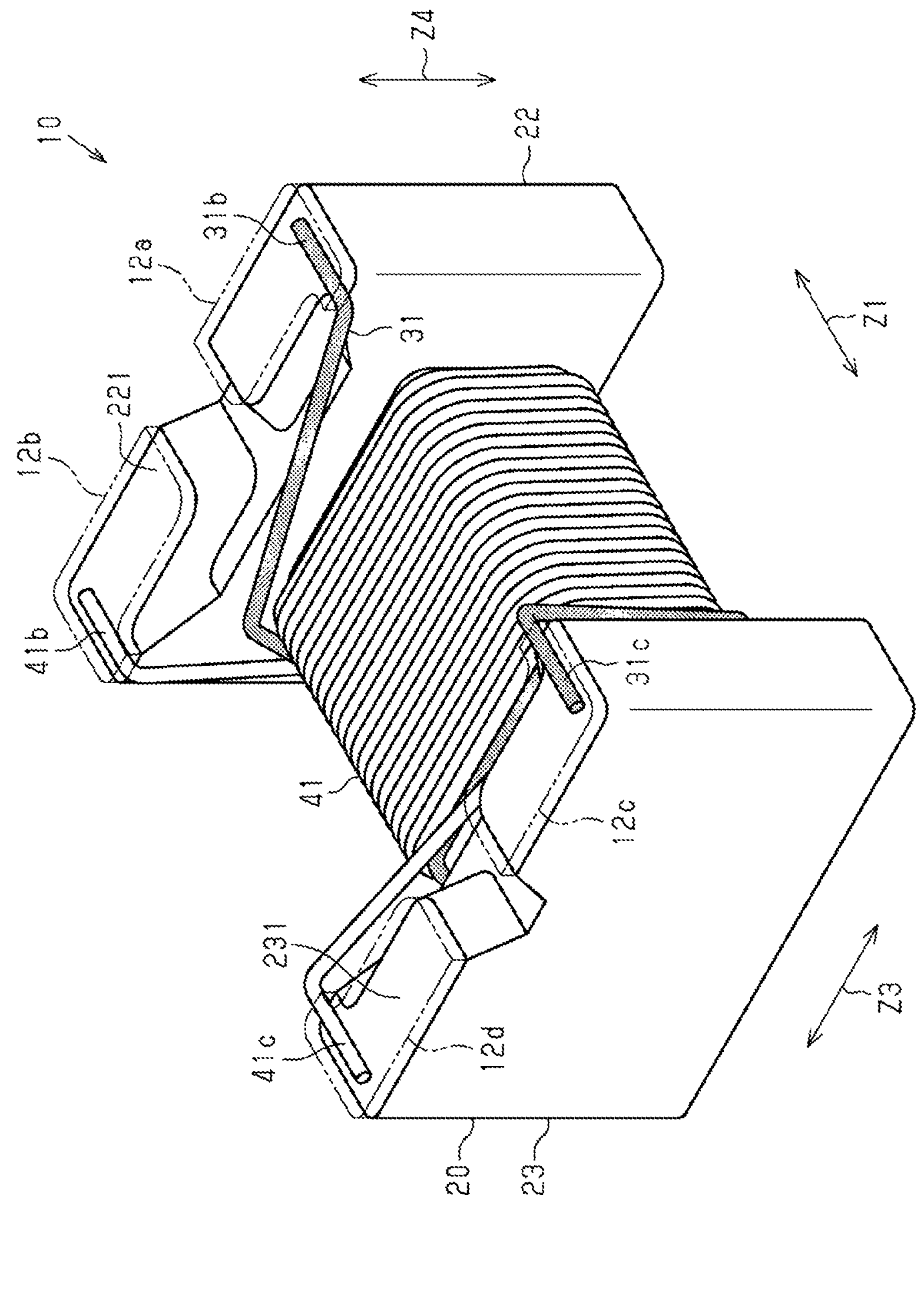
FIG. 1 is a perspective view schematically illustrating one embodiment of a coil component.

Hereinafter, an embodiment of a coil component and a manufacturing method of the coil component will be described with reference to FIGS. 1 to 6. Incidentally, in the drawings, components may be illustrated in an enlarged manner for easy understanding. The dimensional ratios of the components may be different from the actual ones or those in another drawing. Further, although hatching is applied in the sectional view, hatching of some components may be omitted for easy understanding.

As illustrated in FIG. 1, a coil component 10 includes a core 20 and a plurality of wires 31 and 41 wound around the core 20. The coil component 10 is, for example, a common mode choke coil.

The core 20 contains, for example, an electrically insulating material. Specifically, the core 20 contains a non-magnetic material such as alumina and a resin, and a magnetic material such as ferrite and a magnetic powder-containing resin. Preferably, the core 20 is configured of a sintered body such as alumina or ferrite.

The core 20 includes a polygonal winding core portion 21, a first flange portion 22 connected to a first end of the winding core portion 21 in an axial direction Z1, and a second flange portion 23 connected to a second end of the winding core portion 21 in the axial direction Z1. That is, the winding core portion 21 extending in the axial direction Z1 is disposed between one pair of flange portions 22 and 23 disposed side by side in the axial direction Z1. The axial direction Z1 is an extending direction of a central axis F of the winding core portion 21 illustrated in FIG. 2.

Figure 2:
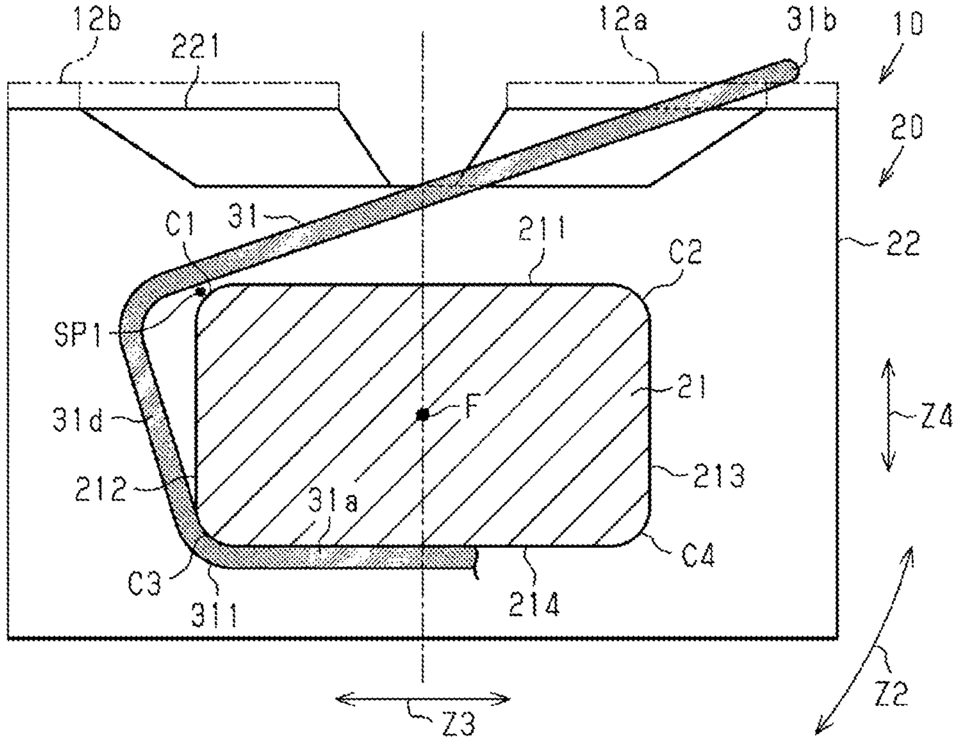
FIG. 2 is a sectional view of the coil component.

FIG. 2 illustrates a section of the winding core portion 21, the first flange portion 22, and a part of the first wire 31 when the winding core portion 21 is cut in a direction orthogonal to the axial direction Z1. In this embodiment, as illustrated in FIG. 2, the winding core portion 21 is a quadrangular prism. Of course, the winding core portion 21 may not be a quadrangular prism as long as the winding core portion has a prismatic shape. Further, two corners exist on the first side with respect to the central axis F in the direction orthogonal to the axial direction Z1. Further, two corners exist on the second side with respect to the central axis F in the direction orthogonal to the axial direction Z1.

In a case where the winding core portion 21 is a quadrangular prism, the winding core portion 21 has four side surfaces 211, 212, 213, and 214. In a circumferential direction Z2 centered on the central axis F of the winding core portion 21, the first end of the side surface 211 is connected to the second end of the side surface 212 with a corner C1 interposed therebetween. The second end of the side surface 211 is connected to the first end of the side surface 213 with a corner C2 interposed therebetween. The first end of the side surface 212 is connected to the second end of the side surface 214 with a corner C3 interposed therebetween. The second end of the side surface 213 is connected to the first end of the side surface 214 with a corner C4 interposed therebetween. "The first end of the side surface" described here is an end in a counterclockwise direction of the circumferential direction Z2 centered on the central axis F of the winding core portion 21 in FIG. 2. Further, "the second end of the side surface" is an end in a clockwise direction of the circumferential direction Z2 in FIG. 2.

The sectional shape of the winding core portion 21 is a rectangular shape. In the section, the length dimension of the side surface 211 is longer than the length dimension of the side surface 212 and the length dimension of the side surface 213. The length dimension of the side surface 214 is longer than the length dimension of the side surface 212 and the length dimension of the side surface 213. In the section illustrated in FIG. 2, the direction in which the side surface 211 extends is referred to as a "first direction Z3", and the direction in which the side surface 212 extends is referred to as a "second direction Z4". The first direction Z3 and the second direction Z4 are directions orthogonal to the axial direction Z1.

The first flange portion 22 and the second flange portion 23 protrude outward from the winding core portion 21 in the first direction Z3. The first flange portion 22 and the second flange portion 23 protrude outward from the winding core portion 21 in the second direction Z4.

As illustrated in FIG. 1, among the side surfaces of the first flange portion 22, the side surface corresponding to the circuit board when the coil component 10 is mounted on the circuit board is referred to as a first mounting surface 221. Among the side surfaces of the second flange portion 23, the side surface corresponding to the circuit board when the coil component 10 is mounted on the circuit board is referred to as a second mounting surface 231.

In this embodiment, as illustrated in FIGS. 1 and 2, a terminal electrode 12*a* for the first wire 31 and a terminal electrode 12*b* for the second wire 41 are provided on the first mounting surface 221. That is, the terminal electrode 12*b* is disposed at the same position as the terminal electrode 12*a* in the axial direction Z1. Further, the terminal electrode 12*b* is positioned on the opposite side of the terminal electrode 12*a* across the central axis F of the winding core portion 21 in the first direction Z3.

Figure 4:
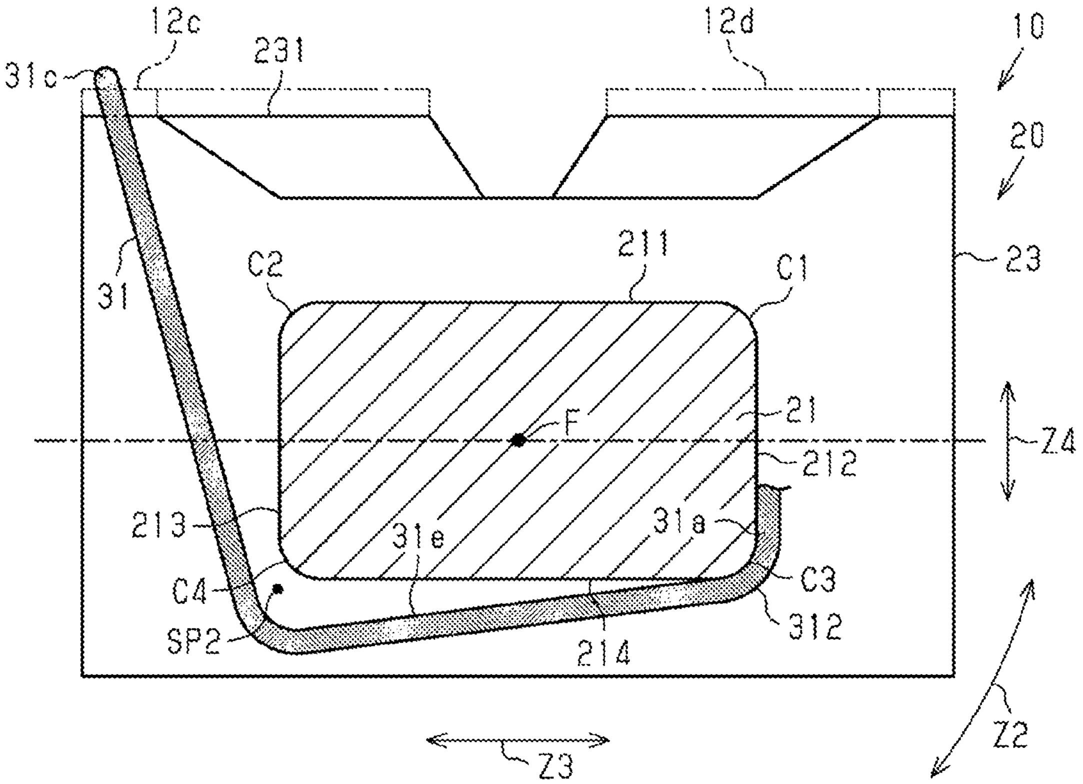
FIG. 4 is a sectional view of the coil component.

FIG. 4 illustrates a section of the winding core portion 21, the second flange portion 23, and a part of the first wire 31 when the winding core portion 21 is cut in a direction orthogonal to the axial direction Z1. In this embodiment, as illustrated in FIGS. 1 and 4, a terminal electrode 12*c* for the first wire 31 and a terminal electrode 12*d* for the second wire 41 are provided on the second mounting surface 231. That is, the terminal electrode 12*d* is disposed at the same position as the terminal electrode 12*c* in the axial direction Z1. Further, the terminal electrode 12*d* is positioned on the opposite side of the terminal electrode 12*c* across the central axis F in the first direction Z3.

Coated conducting wires are used as the first wire 31 and the second wire 41. The coated conducting wire includes a linear central conductor and a coating film formed of resin. That is, the wires 31 and 41 are obtained by covering the central conductors with the coating films. Incidentally, the resin forming the coating film is an insulating resin.

The first wire 31 and the second wire 41 are wound around the winding core portion 21 of the core 20. In this embodiment, the first wire 31 and the second wire 41 are wound around the winding core portion 21 by lap winding. That is, the first wire 31 is directly wound around the winding core portion 21, and the second wire 41 is wound around the winding core portion 21 from above. Further, the number of windings of the first wire 31 around the winding core portion 21 is substantially the same as the number of windings of the second wire 41 around the winding core portion 21.

Incidentally, a method of winding the first wire 31 and the second wire 41 around the winding core portion 21 may not be lap winding. For example, the first wire 31 and the second wire 41 may be wound around the winding core portion 21 by bifilar winding, or both a region where the first wire 31 and the second wire 41 are wound around the winding core portion 21 by lap winding and a region where the first wire 31 and the second wire 41 are wound around the winding core portion 21 by bifilar winding may be formed.

As illustrated in FIGS. 1, 2, and 4, the first wire 31 includes a first winding portion 31*a*, a first end portion 31*b*, a second end portion 31*c*, a first extended portion 31*d*, and a second extended portion 31*e*. The first winding portion 31*a* is a portion of the first wire 31 wound around the winding core portion 21. In the first winding portion 31*a*, the first wire 31 comes into contact with the corners C1 to C4 before being wound once around the winding core portion 21. The first end portion 31*b* is a portion of the first wire 31 electrically connected to the terminal electrode 12*a*. The second end portion 31*c* is a portion of the first wire 31 electrically connected to the terminal electrode 12*c*. That is, in a case where the terminal electrode provided on the first flange portion 22 is defined as a "first terminal electrode," and the terminal electrode provided on the second flange portion 23 is defined as a "second terminal electrode," the terminal electrode 12*a* corresponds to the first terminal electrode, and the terminal electrode 12*c* corresponds to the second terminal electrode.

The first extended portion 31*d* is a portion of the first wire 31 connecting the first winding portion 31*a* and the first end portion 31*b*. The second extended portion 31*e* is a portion of the first wire 31 connecting the first winding portion 31*a* and the second end portion 31*c*. In this embodiment, the first end portion 31*b* and the second end portion 31*c* of the first wire 31 are electrically connected to the terminal electrode positioned on the first side with respect to the central axis F in the first direction Z3 among the plurality of terminal electrodes 12*a* to 12*d*.

The tension of the first extended portion 31*d* is smaller than the tension of the first winding portion 31*a*. Further, as illustrated in FIG. 2, a gap SP1 is interposed between the corner C1 of the winding core portion 21 and the first extended portion 31*d*. Specifically, the gap SP1 is interposed between a bent portion of the first extended portion 31*d* described later and the corner C1. In this example, a gap is also interposed between the first extended portion 31*d* and the side surface 212 of the winding core portion 21.

A boundary portion between the first extended portion 31*d* and the first winding portion 31*a* of the first wire 31 is defined as a first boundary portion 311. The first boundary portion 311 is positioned on the opposite side of the first end portion 31*b* across the central axis F in the first direction Z3. As described above, the first end portion 31*b* is positioned on the first side with respect to the central axis F in the first direction Z3, and thus the first boundary portion 311 is positioned on the second side with respect to the central axis F in the first direction Z3.

It is assumed that the first direction Z3 which is a direction orthogonal to the axial direction Z1 is defined as a first specified direction. Further, among a plurality of corners C1 and C3 of the winding core portion 21 positioned on the second side with respect to the central axis F in the first direction Z3 defined as the first specified direction, the corner C1 positioned closest to the first end portion 31*b* in the circumferential direction Z2 is referred to as a "first predetermined corner," and the corner C3 positioned second closest to the first end portion 31*b* in the circumferential direction Z2 is referred to as a "second predetermined corner." In this case, the corner C1 as the first predetermined corner is positioned between the first end portion 31*b* and the first boundary portion 311 in the circumferential direction Z2. Further, the first boundary portion 311 is positioned at the same position as the corner C3 as the second predetermined corner in the circumferential direction Z2. That is, the first boundary portion 311 is in contact with the corner C3.

Incidentally, the first extended portion 31*d* has a shape along the side surface of the winding core portion 21. That is, the first extended portion 31*d* includes a straight portion following the side surface 212 and a bent portion following the corner C1.

The tension of the second extended portion 31*e* is smaller than the tension of the first winding portion 31*a*. Further, as illustrated in FIG. 4, a gap SP2 is interposed between the corner C4 of the winding core portion 21 and the second extended portion 31*e*. Specifically, the gap SP2 is interposed between a bent portion of the second extended portion 31*e* described later and the corner C4. In this example, a gap is also interposed between the second extended portion 31*e* and the side surface 214 of the winding core portion 21.

A boundary portion between the second extended portion 31*e* and the first winding portion 31*a* of the first wire 31 is defined as a second boundary portion 312. The second boundary portion 312 is positioned on the opposite side of the second end portion 31*c* across the central axis F in the second direction Z4. Since the second end portion 31*c* is positioned on the first side with respect to the central axis F in the second direction Z4, the second boundary portion 312 is positioned on the second side with respect to the central axis F in the second direction Z4.

It is assumed that the second direction Z4 which is a direction orthogonal to the axial direction Z1 is defined as a second specified direction. Further, among a plurality of corners C3 and C4 of the winding core portion 21 positioned on the second side with respect to the central axis F in the second direction Z4 defined as the second specified direction, the corner C4 positioned closest to the second end portion 31*c* in the circumferential direction Z2 is referred to as a "first specified corner," and the corner C3 positioned second closest to the second end portion 31*c* in the circumferential direction Z2 is referred to as a "second specified corner." In this case, the corner C4 as the first specified corner is positioned between the second end portion 31*c* and the second boundary portion 312 in the circumferential direction Z2. Further, the second boundary portion 312 is positioned at the same position as the corner C3 as the second specified corner in the circumferential direction Z2. That is, the second boundary portion 312 is in contact with the corner C3.

Incidentally, the second extended portion 31*e* has a shape along the side surface of the winding core portion 21. That is, the second extended portion 31*e* includes a straight portion following the side surface 214 and a bent portion following the corner C4.

Figure 3:
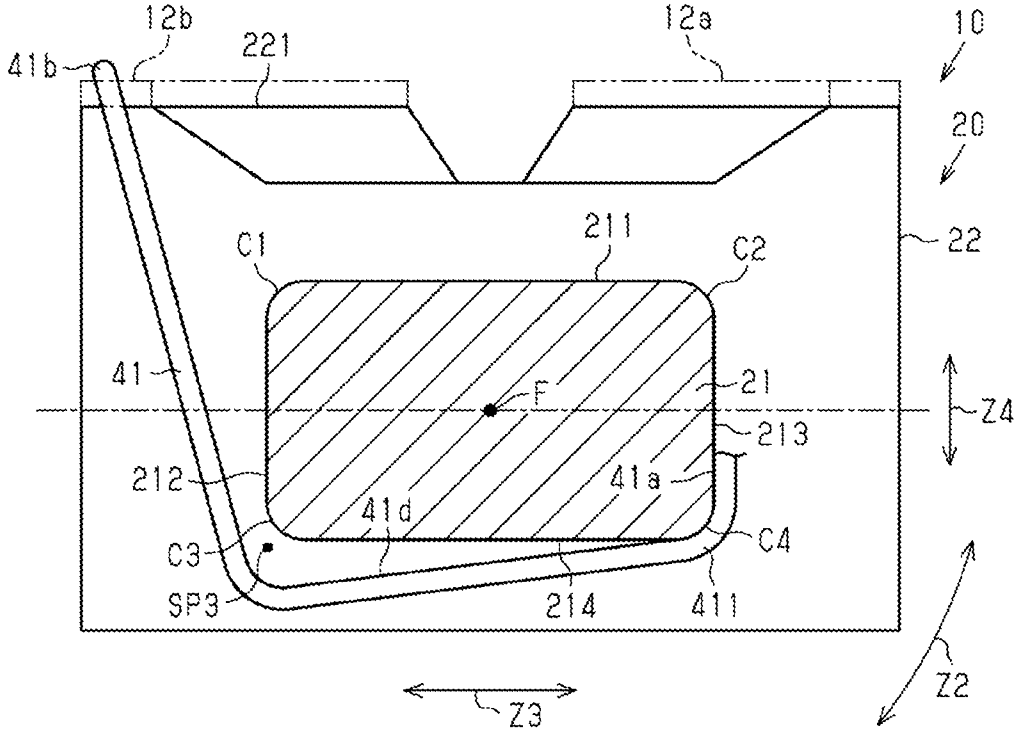
FIG. 3 is a sectional view of the coil component.
Figure 5:
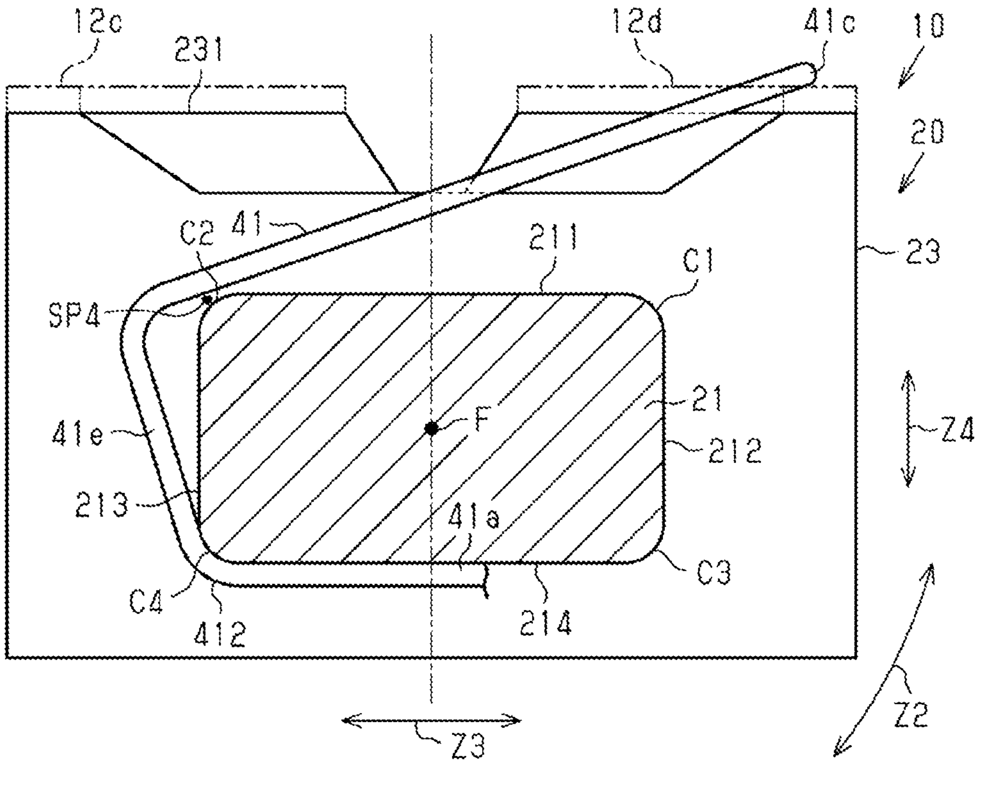
FIG. 5 is a sectional view of the coil component.

FIG. 3 illustrates each of a section of the winding core portion 21, the first flange portion 22, and a part of the second wire 41 when the winding core portion 21 is cut in a direction orthogonal to the axial direction Z1. FIG. 5 illustrates each of a section of the winding core portion 21, the second flange portion 23, and a part of the second wire 41 when the winding core portion 21 is cut in a direction orthogonal to the axial direction Z1.

As illustrated in FIGS. 1, 3, and 5, the second wire 41 includes a second winding portion 41*a*, a third end portion 41*b*, a fourth end portion 41*c*, a third extended portion 41*d*, and a fourth extended portion 41*e*. The second winding portion 41*a* corresponds to the first winding portion 31*a* of the first wire 31. The third end portion 41*b* corresponds to the first end portion 31*b* of the first wire 31, and the fourth end portion 41*c* corresponds to the second end portion 31*c* of the first wire 31. The third extended portion 41*d* corresponds to the first extended portion 31*d* of the first wire 31, and the fourth extended portion 41*e* corresponds to the second extended portion 31*e* of the first wire 31.

The second winding portion 41*a* is a portion of the second wire 41 wound around the winding core portion 21. The third end portion 41*b* is a portion of the second wire 41 electrically connected to the terminal electrode 12*b*. The fourth end portion 41*c* is a portion of the second wire 41 electrically connected to the terminal electrode 12*d*. That is, in a case where the terminal electrode provided on the first flange portion 22 is defined as a "first terminal electrode," and the terminal electrode provided on the second flange portion 23 is defined as a "second terminal electrode," the terminal electrode 12*b* corresponds to the first terminal electrode, and the terminal electrode 12*d* corresponds to the second terminal electrode.

The third extended portion 41*d* is a portion of the second wire 41 connecting the second winding portion 41*a* and the third end portion 41*b*. The fourth extended portion 41*e* is a portion of the second wire 41 connecting the second winding portion 41*a* and the fourth end portion 41*c*. In this embodiment, the third end portion 41*b* and the fourth end portion 41*c* of the second wire 41 are electrically connected to the terminal electrode positioned on the second side with respect to the central axis F in the first direction Z3 among the plurality of terminal electrodes 12*a* to 12*d*.

The tension of the third extended portion 41*d* is smaller than the tension of the second winding portion 41*a*. Further, as illustrated in FIG. 3, a gap SP3 is interposed between the corner C3 of the winding core portion 21 and the third extended portion 41*d*. Specifically, the gap SP3 is interposed between a bent portion of the third extended portion 41*d* described later and the corner C3. In this example, a gap is also interposed between the third extended portion 41*d* and the side surface 214 of the winding core portion 21.

A boundary portion between the third extended portion 41*d* and the second winding portion 41*a* of the second wire 41 is defined as a third boundary portion 411. The third boundary portion 411 is positioned on the opposite side of the third end portion 41*b* across the central axis F in the second direction Z4. As described above, the third end portion 41*b* is positioned on the first side with respect to the central axis F in the second direction Z4, and thus the third boundary portion 411 is positioned on the second side with respect to the central axis F in the second direction Z4.

It is assumed that the second direction Z4 which is a direction orthogonal to the axial direction Z1 is defined as a third specified direction. Further, among a plurality of corners C3 and C4 of the winding core portion 21 positioned on the second side with respect to the central axis F in the second direction Z4 defined as the third specified direction, the corner C3 positioned closest to the third end portion 41*b* in the circumferential direction Z2 is referred to as a "third predetermined corner," and the corner C4 positioned second closest to the third end portion 41*b* in the circumferential direction Z2 is referred to as a "fourth predetermined corner." In this case, the corner C3 as the third predetermined corner is positioned between the third end portion 41*b* and the third boundary portion 411 in the circumferential direction Z2. Further, the third boundary portion 411 is positioned at the same position as the corner C4 as the fourth predetermined corner in the circumferential direction Z2. That is, the third boundary portion 411 is in contact with the corner C4.

Incidentally, the third extended portion 41*d* has a shape along the side surface of the winding core portion 21. That is, the third extended portion 41*d* includes a straight portion following the side surface 214 and a bent portion following the corner C3.

The tension of the fourth extended portion 41*e* is smaller than the tension of the second winding portion 41*a*. Further, as illustrated in FIG. 5, a gap SP4 is interposed between the corner C2 of the winding core portion 21 and the fourth extended portion 41*e*. Specifically, the gap SP4 is interposed between a bent portion of the fourth extended portion 41*e* described later and the corner C2. In this example, a gap is also interposed between the fourth extended portion 41*e* and the side surface 213 of the winding core portion 21.

A boundary portion between the fourth extended portion 41*e* and the second winding portion 41*a* of the second wire 41 is defined as a fourth boundary portion 412. The fourth boundary portion 412 is positioned on the opposite side of the fourth end portion 41*c* across the central axis F in the first direction Z3. Since the fourth end portion 41*c* is positioned on the second side with respect to the central axis F in the first direction Z3, the fourth boundary portion 412 is positioned on the first side with respect to the central axis F in the first direction Z3.

It is assumed that the first direction Z3 which is a direction orthogonal to the axial direction Z1 is defined as a fourth specified direction. Further, among a plurality of corners C2 and C4 of the winding core portion 21 positioned on the first side with respect to the central axis F in the first direction Z3 defined as the fourth specified direction, the corner C2 positioned closest to the fourth end portion 41*c* in the circumferential direction Z2 is referred to as a "third specified corner," and the corner C4 positioned second closest to the fourth end portion 41*c* in the circumferential direction Z2 is referred to as a "fourth specified corner." In this case, the corner C2 as the third specified corner is positioned between the fourth end portion 41*c* and the fourth boundary portion 412 in the circumferential direction Z2. Further, the fourth boundary portion 412 is positioned at the same position as the corner C4 as the fourth specified corner in the circumferential direction Z2. That is, the fourth boundary portion 412 is in contact with the corner C4.

Incidentally, the fourth extended portion 41*e* has a shape along the side surface of the winding core portion 21. That is, the fourth extended portion 41*e* includes a straight portion following the side surface 213 and a bent portion following the corner C2.

The operation of this embodiment will be described.

In the coil component 10, coated conducting wires are adopted as the wires 31 and 41. Then, the two coated conducting wires are wound around the winding core portion 21 in an adjacent state. When such a coil component 10 is mounted on a circuit board using solder, a flux component contained in the solder may reach the winding core portion 21 from the terminal electrodes 12*a* to 12*d* along the wires 31 and 41.

In this respect, in the coil component 10, as illustrated in FIG. 2, the gap SP1 is interposed between the first extended portion 31*d* and the corner C1. In this case, the length of the first extended portion 31*d* is longer than that of the coil component in which no gap is interposed between the first extended portion and the first predetermined corner. That is, the distance from the first boundary portion 311 in contact with the winding core portion 21 to the first end portion 31*b* of the first wire 31 connected to the terminal electrode 12*a* is long. Therefore, also in a case where the flux component contained in the solder travels along the first wire 31, it is possible to suppress the flux component from reaching the winding core portion 21. As a result, occurrence of an electrical short circuit and an insulation failure in the coil component 10 can be suppressed, and the reliability of the coil component 10 can be increased.

In this embodiment, the following effects can be further obtained.

(1-1) In this embodiment, as illustrated in FIG. 4, the gap SP2 is interposed between the second extended portion 31*e* and the corner C4 of the winding core portion 21. As a result, by exhibiting the same operation as the above-described operation, it is possible to suppress the flux component from reaching the winding core portion 21 also in a case where the flux component travels along the first wire 31.

(1-2) In this embodiment, as illustrated in FIG. 3, the gap SP3 is interposed between the third extended portion 41*d* and the corner C3 of the winding core portion 21. As a result, by exhibiting the same operation as the above-described operation, it is possible to suppress the flux component from reaching the winding core portion 21 also in a case where the flux component travels along the second wire 41.

(1-3) In this embodiment, as illustrated in FIG. 5, the gap SP4 is interposed between the fourth extended portion 41*e* and the corner C2 of the winding core portion 21. As a result, by exhibiting the same operation as the above-described operation, it is possible to suppress the flux component from reaching the winding core portion 21 also in a case where the flux component travels along the second wire 41.

(1-4) In this embodiment, as illustrated in FIG. 2, the first boundary portion 311 of the first wire 31 is in contact with the corner C3. As a result, it is possible to reduce the tension of the first extended portion 31*d* while suppressing the disturbance of the winding of the first wire 31 forming the first winding portion 31*a*.

(1-5) In this embodiment, as illustrated in FIG. 4, the second boundary portion 312 of the first wire 31 is in contact with the corner C3. As a result, it is possible to reduce the tension of the second extended portion 31*e* while suppressing the disturbance of the winding of the first wire 31 forming the first winding portion 31*a*.

(1-6) In this embodiment, as illustrated in FIG. 3, the third boundary portion 411 of the second wire 41 is in contact with the corner C4. As a result, it is possible to reduce the tension of the third extended portion 41*d* while suppressing the disturbance of the winding of the second wire 41 forming the second winding portion 41*a*.

(1-7) In this embodiment, as illustrated in FIG. 5, the fourth boundary portion 412 of the second wire 41 is in contact with the corner C4. As a result, it is possible to reduce the tension of the fourth extended portion 41*e* while suppressing the disturbance of the second wire 41 forming the second winding portion 41*a*.

Next, an example of the manufacturing method of the coil component will be described with reference to FIG. 6. Here, a case where the first wire 31 of the first wire 31 and the second wire 41 is wound around the core 20 will be described. Since a method of winding the second wire 41 around the core 20 is substantially equivalent to a method of winding the first wire 31 around the core 20, the description thereof is omitted here.

First, in a first temporary fixing process in step S11, the first end portion 31*b* which is the initial winding end portion of the first wire 31 is temporarily fixed to the terminal electrode 12*a* of the first flange portion 22. Any method can be applied to the temporary fixing here as long as the first end portion 31*b* can be prevented from moving until the winding of the first wire 31 around the core 20 is completed. For example, the first end portion 31*b* may be temporarily fixed to the terminal electrode 12*a* by thermocompression bonding.

In a first tension adjusting process in next step S13, the first extended portion 31*d* of the first wire 31 is formed. For example, the tension when the first wire 31 is wound around the winding core portion 21, that is, the tension of the first wire 31 when the first winding portion 31*a* is formed is defined as a reference tension Pb. In the first tension adjusting process, for example, the first wire 31 starts to be wound around the winding core portion 21 in a state where the reference tension Pb is applied to the first wire 31. In this case, the first wire 31 comes into contact with the corner C1. Further, the first wire 31 also comes into contact with the side surface 212 connected to the corner C1. Further, when the first wire 31 comes into contact with the corner C3, the tension applied to the first wire 31 is made smaller than the reference tension Pb. Examples of a method of reducing the tension include a method of feeding the first wire 31 to the corner C1 side in the circumferential direction Z2, and a method of rotating the core 20 in a direction in which the first wire 31 is wound around the winding core portion 21 in the circumferential direction Z2. Then, a part of the first wire 31 is separated from the winding core portion 21. Thus, the first extended portion 31*d* is formed. Specifically, the first extended portion 31*d* can have a shape along the side surface of the winding core portion 21.

Then, in a winding process in step S15, the first winding portion 31*a* of the first wire 31 is formed. That is, the first wire 31 is wound around the winding core portion 21 in a state where the tension applied to the first wire 31 is returned to the reference tension Pb. When the formation of the first winding portion 31*a* is completed, the winding process ends.

In a second tension adjusting process in next step S17, the second extended portion 31*e* of the first wire 31 is formed. For example, in the second tension adjusting process, for example, the first wire 31 is carried to the terminal electrode 12*c* in a state where the reference tension Pb is applied to the first wire 31. In this state, the portion of the first wire 31 configuring the second extended portion 31*e* is in contact with the corner C3, the side surface 214, and the corner C4. Subsequently, the tension applied to the first wire 31 is lower than the reference tension Pb. The tension at this time may be equal to the tension at the time of the first tension adjusting process, for example. As a result, the second extended portion 31*e* of the first wire 31 is separated from the winding core portion 21. That is, the second extended portion 31*e* which is not in contact with the side surface 214 and the corner C4 is formed. In this case, the second extended portion 31*e* can have a shape along the side surface of the winding core portion 21.

Then, in a second temporary fixing process in step S19, the second end portion 31*c* which is the terminal winding end portion of the first wire 31 is temporarily fixed to the terminal electrode 12*c* of the second flange portion 23. Any method can be applied to the temporary fixing here. For example, the second end portion 31*c* may be temporarily fixed to the terminal electrode 12*c* by thermocompression bonding.

In a cutting process in the next step S21, the wire is cut. That is, the first wire 31 wound around the core 20 is separated from the wire held by a manufacturing apparatus.

Further, in a main fixing process in step S23, the first end portion 31*b* is electrically connected to the terminal electrode 12*a* by, for example, thermal welding. Similarly, the second end portion 31*c* is electrically connected to the terminal electrode 12*c*.

Figure 6:
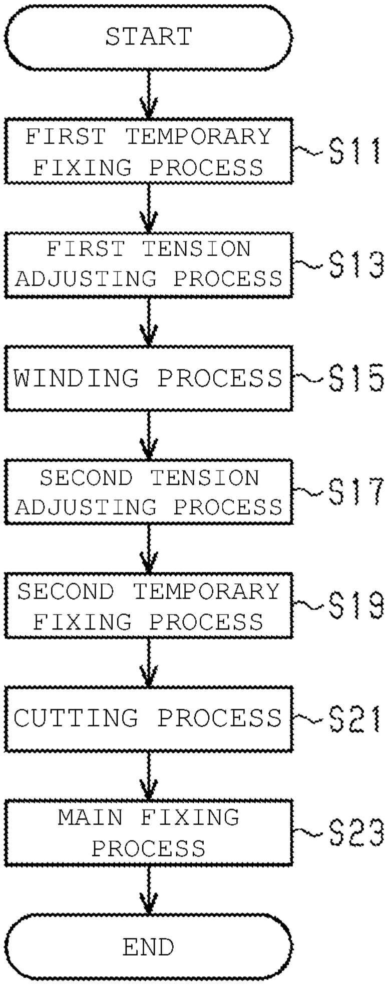
FIG. 6 is a flowchart for explaining a manufacturing process of a coil component.

That is, in the manufacturing method illustrated in FIG. 6, steps S11 and S13 are steps before the step of forming the first winding portion 31*a*, and correspond to a step of temporarily fixing the first end portion 31*b* of the first wire 31 to the terminal electrode 12*a*, and a step of extending the first wire 31 from the terminal electrode 12*a* to the winding core portion 21 in a state where the tension of the first wire 31 is set to be smaller than that in the case of forming the first winding portion 31*a*, respectively. Step S15 corresponds to a process of forming the first winding portion 31*a* by winding the first wire 31 around the winding core portion 21. Steps S17 and S19 correspond to a step of extending the first wire 31 from the winding core portion 21 to the terminal electrode 12*c* and fixing the second end portion 31*c* of the first wire 31 to the terminal electrode 12*c* in a state where the tension of the first wire 31 is smaller than that in the step of forming the first winding portion 31*a*.

According to the manufacturing method of this embodiment, the following effects can be obtained.

(1-8) The gap SP1 is easily interposed between the first extended portion 31*d* of the first wire 31 and the corner C1 of the winding portion 31*a*. Further, the gap SP2 is easily interposed between the second extended portion 31*e* of the first wire 31 and the corner C4 of the winding portion 31*a*. That is, the coil component 10 can be easily manufactured.

The above embodiment can be modified as follows. The above embodiment and following modifications can be implemented in combination with each other within a range not technically contradictory.

Figure 7:
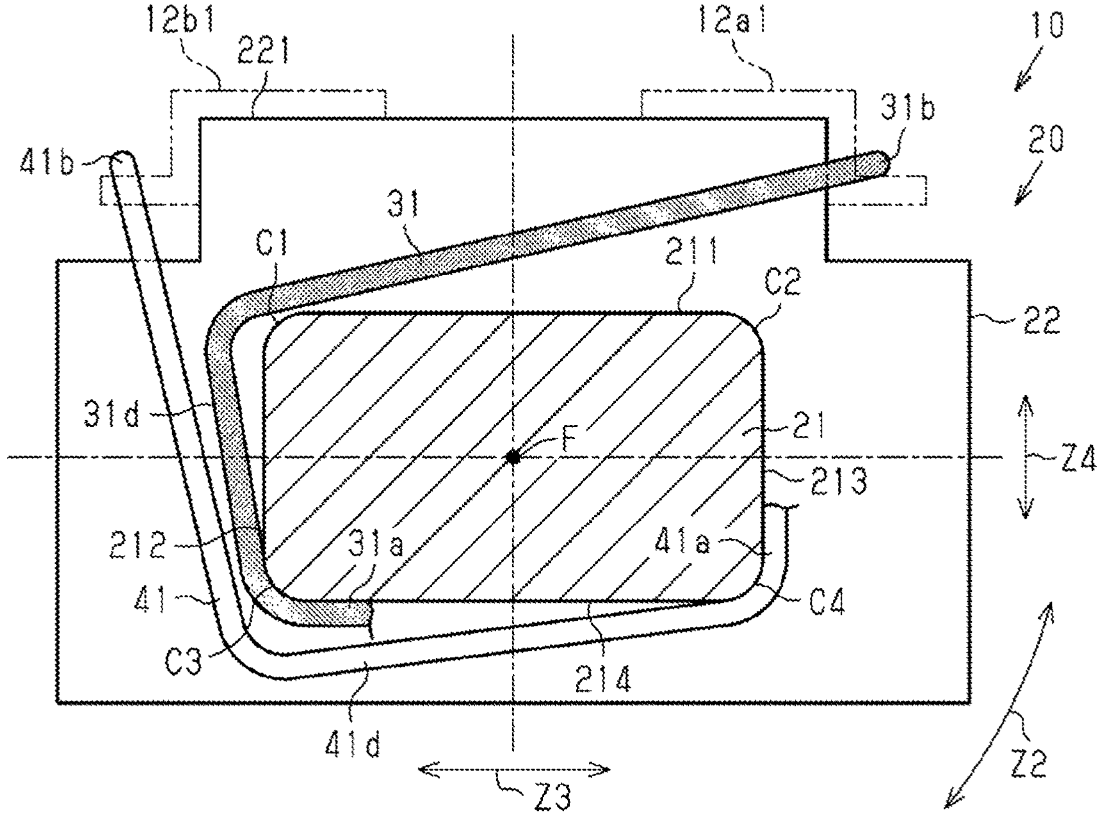
FIG. 7 is a sectional view of a coil component in a modification.

The terminal electrode may be formed of, for example, a metal plate as illustrated in FIG. 7. Incidentally, in the example illustrated in FIG. 7, a terminal electrode 12*a*1 to which the first end portion 31*b* of the first wire 31 is electrically connected is provided in the first flange portion 22, and a terminal electrode 12*b*1 to which the third end portion 41*b* of the second wire 41 is electrically connected is provided in the first flange portion 22.

As long as the second extended portion 31*e* is separated from the winding core portion 21, the second boundary portion 312 may not be in contact with the corner C3.

As long as the fourth extended portion 41*e* is separated from the winding core portion 21, the fourth boundary portion 412 may not be in contact with the corner C4.

As long as the first extended portion 31*d* is separated from the winding core portion 21, the first boundary portion 311 may not be in contact with the corner C3.

As long as the third extended portion 41*d* is separated from the winding core portion 21, the third boundary portion 411 may not be in contact with the corner C4.

The tension of the second extended portion 31*e* may be equal to the tension of the first winding portion 31*a*.

The tension of the fourth extended portion 41*e* may be equal to the tension of the second winding portion 41*a*.

The tension of the first extended portion 31*d* may be equal to the tension of the first winding portion 31*a*.

The tension of the third extended portion 41*d* may be equal to the tension of the second winding portion 41*a*.

When the second extended portion 31*e* is separated from the winding core portion 21, it is not essential that the shape of the second extended portion 31*e* is a shape along the side surface of the winding core portion 21.

When the fourth extended portion 41*e* is separated from the winding core portion 21, it is not essential that the shape of the fourth extended portion 41*e* is a shape along the side surface of the winding core portion 21.

When the first extended portion 31*d* is separated from the winding core portion 21, it is not essential that the shape of the first extended portion 31*d* is a shape along the side surface of the winding core portion 21.

When the third extended portion 41*d* is separated from the winding core portion 21, it is not essential that the shape of the third extended portion 41*d* is a shape along the side surface of the winding core portion 21.

Regarding the first wire 31, when the first extended portion 31*d* is separated from the corner C1, it is not essential that the second extended portion 31*e* is separated from the corner C4. In this case, the second tension adjusting process in step S17 may be omitted in the processing procedure of the manufacturing method illustrated in FIG. 6.

When the first extended portion 31*d* of the first wire 31 is separated from the corner C1, it is not essential that the third extended portion 41*d* of the second wire 41 is separated from the corner C3.

When the first extended portion 31*d* of the first wire 31 is separated from the corner C1, it is not essential that the fourth extended portion 41*e* of the second wire 41 is separated from the corner C2.

The first specified direction may not be the first direction Z3. That is, the first specified direction may be a direction different from the first direction Z3 as long as the first end portion 31*b* of the first wire 31 is disposed on the first side with respect to the central axis F, and the first boundary portion 311 is disposed on the second side with respect to the central axis F in the first specified direction.

The second specified direction may not be the second direction Z4. That is, the second specified direction may be a direction different from the second direction Z4 as long as the second end portion 31*c* of the first wire 31 is disposed on the first side with respect to the central axis F, and the second boundary portion 312 is disposed on the second side with respect to the central axis F in the second specified direction. For example, the second specified direction may not be a direction orthogonal to the first specified direction.

The third specified direction may not be the second direction Z4. That is, the third specified direction may be a direction different from the second direction Z4 as long as the third end portion 41*b* of the second wire 41 is disposed on the first side with respect to the central axis F, and the third boundary portion 411 is disposed on the second side with respect to the central axis F in the third specified direction.

The fourth specified direction may not be the first direction Z3. That is, the fourth specified direction may be a direction different from the first direction Z3 as long as the fourth end portion 41*c* of the second wire 41 is disposed on the first side with respect to the central axis F, and the fourth boundary portion 412 is disposed on the second side with respect to the central axis F in the fourth specified direction.

In the above embodiment, the section when the winding core portion 21 is cut in the direction orthogonal to the axial direction Z1 has a rectangular shape, but the present disclosure is not limited thereto. For example, a winding core portion having a square section when the winding core portion 21 is cut may be used as the winding core portion 21.

The winding core portion 21 may not be a quadrangular prism as long as the winding core portion has a prismatic shape. For example, the winding core portion may have a triangular prism shape or a hexagonal prism shape.

In the above embodiment, the winding core portion 21 is configured such that each shape of the side surfaces 211 to 214 when the winding core portion 21 is cut in the direction orthogonal to the axial direction Z1 has a linear shape, but the present disclosure is not limited thereto. That is, it is sufficient if the winding core portion 21 has a ridge line in the section when the winding core portion 21 is cut in the direction orthogonal to the axial direction Z1.

In the coil component, only one wire may be wound around the core.

The coil component may not be a common mode choke coil.

What is claimed is:

1. A coil component comprising:

a core which has a prismatic winding core portion, a first flange portion connected to a first end of the winding core portion in an axial direction which is a direction in which a central axis of the winding core portion extends, and a second flange portion connected to a second end of the winding core portion in the axial direction;

a first terminal electrode in the first flange portion;

a second terminal electrode in the second flange portion; and a wire which has a winding portion wound around the winding core portion, a first end portion electrically connected to the first terminal electrode, a second end portion electrically connected to the second terminal electrode, a first extended portion connecting the winding portion and the first end portion, and a second extended portion connecting the winding portion and the second end portion, wherein in a first specified direction which is a direction orthogonal to the axial direction, the first end portion is disposed on a first side with respect to the central axis, and a first boundary portion which is a boundary portion between the first extended portion and the winding portion is disposed on a second side with respect to the central axis, among a plurality of corners of the winding core portion positioned on the second side with respect to the central axis in the first specified direction, a first predetermined corner which is a corner positioned closest to the first end portion in a circumferential direction around the central axis is positioned between the first boundary portion and the first end portion in the circumferential direction, and a gap is interposed between the first extended portion and the first predetermined corner.

2. The coil component according to claim 1, wherein the first boundary portion is in contact with a second predetermined corner which is a corner positioned second closest to the first end portion in the circumferential direction among the plurality of corners positioned on the second side with respect to the central axis in the first specified direction.

3. The coil component according to claim 2, wherein the first extended portion has a shape along a side surface of the winding core portion.

4. The coil component according to claim 2, wherein the second extended portion has a shape along a side surface of the winding core portion.

5. The coil component according to claim 2, further comprising:

the wire includes a first wire and a second wire, wherein the first wire and the second wire each include the winding portion, the first end portion, the second end portion, the first extended portion, and the second extended portion.

6. The coil component according to claim 1, wherein in a second specified direction which is a direction orthogonal to the axial direction, the second end portion is disposed on the first side with respect to the central axis, and a second boundary portion which is a boundary portion between the second extended portion and the winding portion is disposed on the second side with respect to the central axis, among the plurality of corners of the winding core portion positioned on the second side with respect to the central axis in the second specified direction, a first specified corner which is a corner positioned closest to the second end portion in the circumferential direction around the central axis is positioned between the second boundary portion and the second end portion in the circumferential direction, and a gap is interposed between the second extended portion and the first specified corner.

7. The coil component according to claim 6, wherein the second boundary portion is in contact with a second specified corner which is a corner positioned second closest to the first end portion in the circumferential direction among the plurality of corners positioned on the second side with respect to the central axis in the second specified direction.

8. The coil component according to claim 7, wherein the first extended portion has a shape along a side surface of the winding core portion.

9. The coil component according to claim 7, wherein the second extended portion has a shape along a side surface of the winding core portion.

10. The coil component according to claim 7, further comprising:

the wire includes a first wire and a second wire, wherein the first wire and the second wire each include the winding portion, the first end portion, the second end portion, the first extended portion, and the second extended portion.

11. The coil component according to claim 6, wherein the first extended portion has a shape along a side surface of the winding core portion.

12. The coil component according to claim 6, wherein the second extended portion has a shape along a side surface of the winding core portion.

13. The coil component according to claim 6, further comprising:

the wire includes a first wire and a second wire, wherein the first wire and the second wire each include the winding portion, the first end portion, the second end portion, the first extended portion, and the second extended portion.

14. The coil component according to claim 1, wherein the first extended portion has a shape along a side surface of the winding core portion.

15. The coil component according to claim 14, wherein the second extended portion has a shape along a side surface of the winding core portion.

16. The coil component according to claim 14, further comprising:

the wire includes a first wire and a second wire, wherein the first wire and the second wire each include the winding portion, the first end portion, the second end portion, the first extended portion, and the second extended portion.

17. The coil component according to claim 1, wherein the second extended portion has a shape along a side surface of the winding core portion.

18. The coil component according to claim 1, further comprising:

the wire includes a first wire and a second wire, wherein the first wire and the second wire each include the winding portion, the first end portion, the second end portion, the first extended portion, and the second extended portion.

19. A manufacturing method of a coil component, wherein the coil component includes a core and a wire, the core has a prismatic winding core portion, a first flange portion connected to a first end of the winding core portion in an axial direction which is a direction in which a central axis of the winding core portion extends, and a second flange portion connected to a second end of the winding core portion in the axial direction, and the wire has a winding portion wound around the winding core portion, a first end portion electrically connected to a terminal electrode provided in the first flange portion, a second end portion electrically connected to a terminal electrode provided in the second flange portion, and a first extended portion connecting the winding portion and the first end portion, and a second extended portion connecting the winding portion and the second end portion, the method comprising:

forming the winding portion by winding the wire around the winding core portion; and extending the wire from the winding core portion to the terminal electrode provided in the second flange portion and fixing the second end portion of the wire to the terminal electrode in a state where a tension of the wire is set to be smaller than a tension of the wire in forming the winding portion.

20. The manufacturing method of the coil component according to claim 19, further comprising:

extending the wire from the terminal electrode provided in the first flange portion to the winding core portion in a state where the tension of the wire is set smaller than the tension of the wire in a case of forming the winding portion, the extending being performed before forming the winding portion.

* * * * *